United States Patent [19]

Kamperman et al.

[11] Patent Number: 4,948,476
[45] Date of Patent: Aug. 14, 1990

[54] HYBRID CHROMIUM RECOVERY PROCESS

[75] Inventors: David R. Kamperman; Dwayne T. Friesen, both of Bend, Oreg.

[73] Assignee: Bend Research, Inc., Bend, Oreg.

[21] Appl. No.: 384,153

[22] Filed: Jul. 20, 1989

[51] Int. Cl.⁵ ............................................. C25B 1/00
[52] U.S. Cl. ........................................ 204/89; 204/97;
204/105 R; 204/234; 204/237; 204/252;
204/263; 210/500.37; 210/638; 423/54
[58] Field of Search ................. 204/89, 97, 234, 237,
204/252, 263; 210/500.37, 638; 423/54

[56] References Cited
U.S. PATENT DOCUMENTS 4,144,145  3/1979  Watanabe et al. ................. 204/89
4,437,994  3/1984  Baker ............................... 210/638

Primary Examiner—John F. Niebling
Assistant Examiner—David G. Ryser
Attorney, Agent, or Firm—Chernoff, Vilhauer, McClung & Stenzel

[57] ABSTRACT

There are disclosed method and apparatus for recovering chromium from chromium-containing wastes, using an electrolytic oxidation cell divided by an anion exchange membrane and a coupled transport module containing a membrane containing a chromium(VI) complexing agent.

28 Claims, 4 Drawing Sheets

HYBRID CHROMIUM RECOVERY PROCESS

This invention was made with Government support under Contract Nos. 68024042 and 68024102 awarded by the Environmental Protection Agency. The Government has certain rights in this invention.

BACKGROUND OF THE INVENTION

Industrial waste, especially in the form of hazardous metal-containing effluents, process solution dumps, and sludges, is threatening to become a major environmental contaminant. Most of the recent new technologies developed to meet this problem are aimed at destruction or stabilization, rather than recovery, of the metal values contained in such industrial wastes. Chromium is commonly found in its oxide or hydroxide +3 valence in industrial waste, along with other valuable metals such as copper, silver, cadmium, cobalt, gold, lead, nickel, tin and zinc.

Various attempts have been made using membrane-based solvent extractions to recover metal values from aqueous solutions. See, for example, U.S. Pat. Nos. 3,956,122, 3,957,504 and 4,437,994. However, such methods have not met with much success due to inadequate selectivities and flux rates, which in turn contribute to overall inefficiency. There is therefore a need in metals recovery technology for a truly efficient and economical method of recovering metal values from industrial waste waters. This need and others that will become apparent are met by the process and apparatus of the present invention.

SUMMARY OF THE INVENTION

The present invention comprises a combination of two known processes, electrolytic oxidation and coupled transport (CT), in a unique way to achieve a synergistically efficient recovery of chromium values from aqueous or solid wastes. In its simplest mode, chromium(III) is first at least partially oxidized to chromium(VI) (which typically exists in the form of chromate or dichromate anions) in an electrolytic oxidation cell divided by an anion exchange membrane, then delivered as the feed to a CT module enclosing a CT membrane containing a chromium(VI)-complexing agent, whereby the chromium(VI) anion is complexed, transported across the membrane and liberated or stripped as chromium(VI) in the form of chromate or dichromate anions on the strip side of the membrane, which is in contact with a strongly basic or strip solution. In a most preferred mode, the process is made continuous by recycling the chromium(III)-rich CT retentate to the oxidation cell.

DETAILED DESCRIPTION OF THE INVENTION

Figure 1:
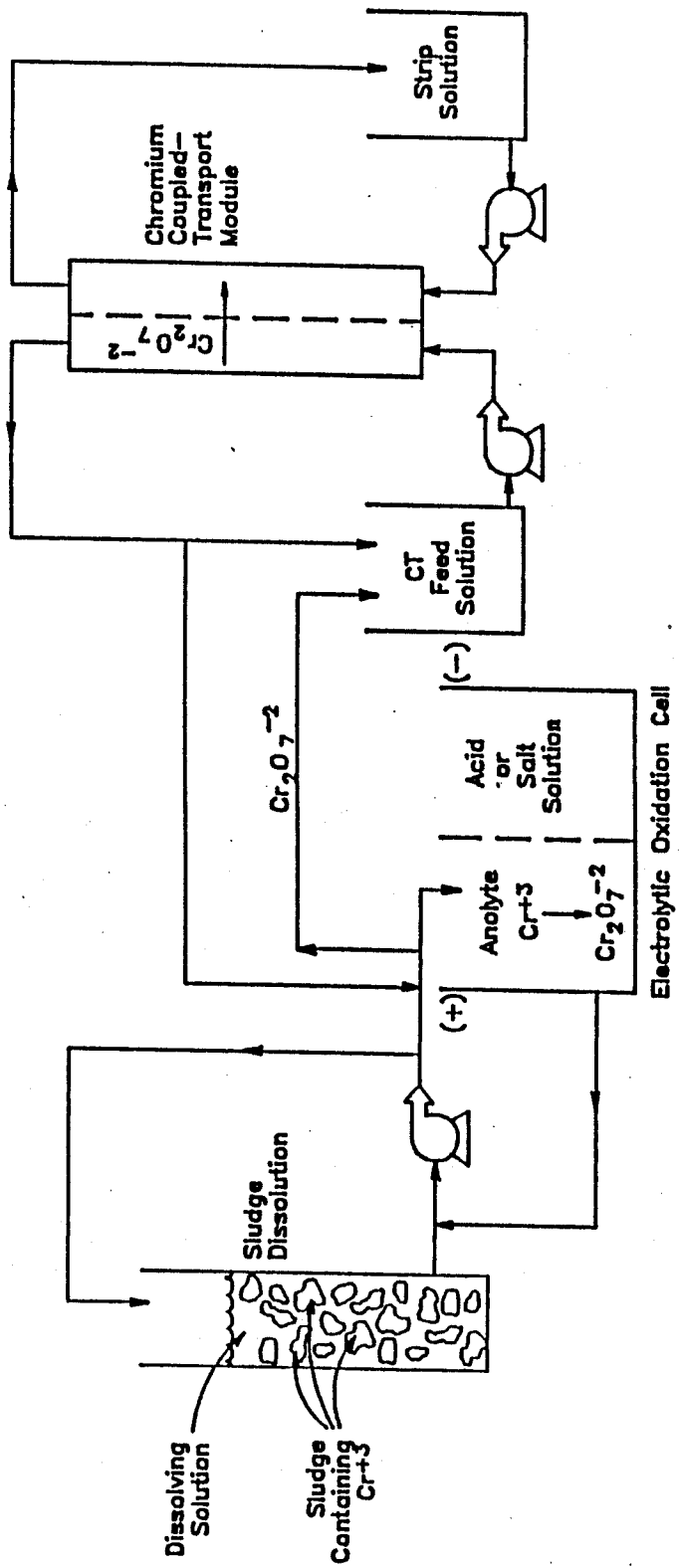
FIG. 1 is a schematic depiction of the overall process and apparatus of the present invention.

According to the present invention, there are provided a unique process and apparatus for the efficient recovery of chromium values from chromium(III)-containing waste waters that utilizes a combination of the two technologies electrolytic oxidation and coupled transport. The process comprises the essential steps of:

(a) providing an electrolytic oxidation cell having at least one anode and at least one cathode and divided into at least one anode side and at least one cathode side by at least one anion exchange membrane, the cathode side having an electrically conductive solution and the anode and cathode being connected to a DC power source;

(b) providing a coupled transport membrane containing a chromium(VI) liquid complexing agent and having a feed side and a strip side;

(c) contacting the aqueous or solid chromium(III)-containing waste with a dissolving acid to form an acidic chromium(III)containing anolyte solution;

(d) directing the acidic chromium(III)-containing anolyte solution to each anode side of the electrolytic oxidation cell;

(e) providing sufficient potential from said DC power source to at least partially oxidize chromium(III) in the acidic chromium(III)-containing anolyte solution to chromium(VI) to form a coupled transport feed solution;

(f) transferring the coupled transport feed solution to the feed side of the coupled transport membrane; and (g) directing a strong base strip solution to the strip side of the coupled transport membrane of said coupled transport module, thereby extracting chromium(VI) in a strip solution from the chromium(VI)containing waste. The process is advantageously made continuous by recycling the CT retentate, relatively rich in chromium(III) concentration, back to the anode side of the electrolytic oxidation cell, and by recycling the strip solution.

The apparatus of the present invention comprises the combination of:

(a) dissolving tank means for at least partially containing aqueous or solid chromium(III)containing waste and for contacting the same with a dissolving acid;

(b) a DC power source;

(c) an electrolytic oxidation cell having at least one anode and at least one cathode and divided into at least one anode side and at least one cathode side by at least one anion exchange membrane, the cathode side having an electrically conductive solution and the anode and cathode being connected to the DC power source;

(d) a coupled transport module housing a coupled transport membrane that contains a chromium(VI) liquid complexing agent and that has a feed side and a strip side;

(e) a strip solution reservoir for at least partially containing a strip solution;

(f) transfer means for transferring the contents of said dissolving tank means to the anode side of said electrolytic oxidation cell;

(g) transfer means for transferring the contents of the anode side of the electrolytic oxidation cell first to the feed side of the coupled transport module and then back to the anode side of the oxidation cell; and (h) transfer means for transferring the contents of the strip/product solution reservoir to the strip side of said coupled transport module and back to said strip/product solution reservoir.

The initial step in the recovery of chromium values from aqueous or solid chromium(III)-containing wastes comprises contacting the effluent or sludge with a strong acid to form an anolyte solution for transfer to the electrolytic oxidation cell. Virtually any strong acid other than nitric acid with a pKa of at least 4 and in a concentration sufficient to maintain the pH at 4.0 or less will do for this dissolving step, but the preferred acid is sulfuric acid. Other suitable acids include phosphoric acid, boric acid, and the hydrogen halide acids HCl, HF and HI.

Two of the keys to the present invention lie in utilizing the facts that chromium(III) is readily oxidized to chromium(VI) and that chromium(VI) exists in anionic form as either the chromate ($CrO_4=$) or dichromate ($Cr_2O_7=$) anion. Consistent with these principles, an anion exchange membrane is used to divide an electrolytic oxidation cell into at least one anode (+) side and at least one cathode (−) side to reject positively-charged Cr(III) cations present in the anolyte solution on the anode side(s). Absent the anion exchange membrane barrier, such Cr(III) cations would migrate to a negatively-charged cathode where they cannot be oxidized to Cr(VI); however, the anion exchange membrane barrier blocks such migration, keeping Cr(III) available for oxidation to Cr(VI) in the anode side. In addition, the anion exchange membrane, though permeable to chromate and dichromate anions, prevents their migration to the cathode by convective flow; contact with the cathode is undesirable since it would result in reduction of Cr(VI) back to Cr(III).

The anion exchange membrane used to divide the electrolytic oxidation cell may be described as a hydrophilic polymer containing primary, secondary, tertiary or quaternary amine groups that is permeable to anions and relatively impermeable to cations, the ratio of anion to cation permeability being at least 20, preferably greater than 100. Exemplary membranes include poly(p-trimethylaminomethyl)styrene, poly(p-dimethylaminomethyl)styrene and radiation-grafted (tetramethylammonium)polyethylene. Such anion exchange membranes are commercially available; examples include the last-mentioned radiation-grafted membrane sold under the name RAIPORE 4035, by RAI Research Corp. of Hauppauge, N.Y., and divinylbenzene/styrene copolymer pressed into a fiber support sold as IONAC MA-3475, by Sybron Chemicals, Inc. of Birmingham, N.J. An especially preferred anion exchange membrane is RAIPORE 4035. The preferred form of the anion exchange membrane is a flat sheet.

The next process step comprises transfer of the acidic anolyte solution to each anode side of each dividing anion exchange membrane for at least partial oxidation of Cr(III) to Cr(VI). Each cathode side of each membrane dividing the oxidation cell is provided with an electrically conductive solution that may be an acid or a salt solution having a concentration of 0.1 M to 10 M and a conductivity of at least 0.1 $(ohm/cm)^{-1}$. Suitable acids are the same ones mentioned above in connection with formation of the anolyte solution for the oxidation cell. Suitable salts are the bisulfates $NaHSO_4$, $KHSO_4$, and $NH_4HSO_4$ and the phosphate $NaH_2PO_4$. Preferably, the anolyte solution is recirculated at the rate of 1 to 100% of the anolyte compartment volume per minute. To this end, a sludge dissolution reservoir is used, along with a recirculatory pump, as shown in FIG. 1.

Sufficient potential is supplied from the DC power source connected to the oxidation cell to at least partially oxidize the chromium(III) in the acidic anolyte solution to chromium(VI) in the anionic forms of chromate and dichromate, thereby forming the feed solution for the CT module. In general, the minimum voltage necessary to oxidize some chromium(III) to chromium(VI) is 1 volt at 10° C. to 90° C. Anode current density may be from 1 to 10 $amp/ft^2$, depending upon the anolyte concentrations of chromium(III) and chromium(VI), which may vary anywhere from 0.01 g/L to saturation, preferably between 1 and 100 g/L, and most preferably from 1 to 20 g/L.

As mentioned above, the anolyte solution, upon partial oxidation of chromium(III) to chromium(VI), becomes the feed solution for the CT module, and so is transferred to the feed side of the CT module, preferably by means of a recirculatory pump to maintain the same recirculation rate mentioned above. To make the process continuous, the feed solution that exits the coupled-transport module, relatively rich in chromium(III) concentration, is returned to the anolyte compartment of the electrolytic oxidation cell, thus commencing another oxidation/CT cycle. The CT module essentially comprises a housing and a polymeric membrane containing a chromium(VI)-complexing agent. The membrane may consist of a microporous polymeric support containing within its pores a chromium(VI)-complexing agent capable of reversibly complexing chromate or dichromate ion. The membrane may be hollow fiber or flat sheets 0.2 to 10 mils in thickness (wall thickness for fibers) with pores 0.001 to 10 microns in diameter and 10 to 90% porous. The form of the membrane module may be potted hollow fibers, flat sheet plate and frame, or flat sheet spiral wound.

The complexing agent may be present in pure form or diluted with a $C_{10}$ to $C_{30}$ hydrocarbon solvent to a concentration of at least 1 wt%, preferably approximately 30 wt%. Suitable complexing agents may be generally described as primary, secondary, tertiary or quaternary amines with 20 to 65 carbon atoms, substantially soluble in hydrocarbon solvents, substantially immiscible in water and of the formula

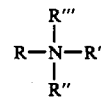

where R, R' R" and R'" are selected from hydrogen, alkyl of 1 to 30 carbon atoms, and aryl of 6 to 30 carbon atoms. Exemplary complexing agents are tri-(isotridecyl)amine (sold under the trademark ADOGEN 383 by Sherex Chemical Co. of Dublin, Ohio), octadecyldimethylamine, tri-N-octylamine, dodecyldimethylamine, tri-N-dodecylamine, tetradecymethylamine, hexadecyldimethylamine, and dimethylhydrogenated tallow amine.

The polymeric support for the CT composite membrane should be chemically resistant to the strongly acid feed and strongly basic product or strip solutions, as well as to the complexing agent. Exemplary materials are polyethylene, polytetrafluoroethylene, polypropylene, polyvinylidenedifluoride, polyphenylene oxide, polysulfone, polyethersulfone, and polyurethane.

On the strip side of the CT membrane a strongly basic strip solution is circulated. In the case of a hollow fiber module, which is preferred, the feed solution may be circulated on either side of the membrane, but is preferably circulated in the lumens or inner portion of the hollow fibers, while the strip solution is circulated on the outside of the fibers. The strip solution should have a pH of at least 9.0 and may be an aqueous solution of an alkaline metal- or alkaline earth metal hydroxide.

Figure 4:
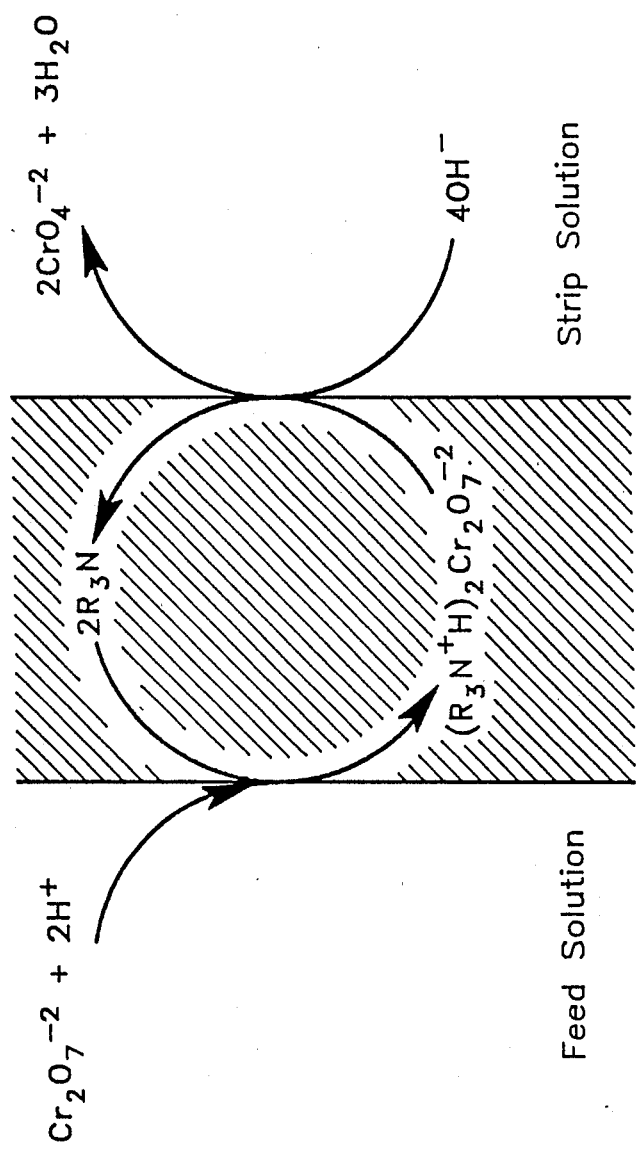
FIG. 4 is a schematic depiction of the chromium(VI) chemical shuttle mechanism across the CT membrane.

As schematically denoted in FIG. 4, dichromate in the anolyte/feed solution in the vicinity of the feed side of the CT membrane is complexed by the complexing agent, diffuses across the CT membrane in the form of chromate- or dichromate-agent complex, freed from the complex on the strip side of the membrane by reaction of the complex with hydroxyl groups, with the stripped complexing agent diffusing back across the membrane to the feed side to repeat the same sequence, the complexing agent effectively acting as a "shuttle" in transporting chromate or dichromate from the feed side to the product or strip side. The transport mechanism actually permits a "chemical pumping" of chromate or dichromate across the membrane against large concentration gradients, thus allowing a concentration of chromate or dichromate on the strip side of the membrane. The chromium(VI) flux across the membrane is at least $1\mu g/cm^2/min$, preferably at least $20\mu g/cm^2/min$. As is the case with the other process steps mentioned, recirculation of the strip solution is preferred, and to that end a strip solution reservoir is provided with a recirculatory pump between the strip/product solution reservoir and the strip side of the CT module.

In addition to chromium(III), the other metals mentioned above in the Background of the Invention above may be present. However, copper(II) and silver(I) ions are best first removed to concentrations of less than 1000 ppm and less than 500 ppm, respectively, so as not to interfere with either the oxidation or coupled transport step. Such removal may be effected in conventional ways by liquid extraction, by coupled transport, or by the use of membrane contactors. Other metals present remain in the feed solution exiting the CT module and are returned to the anolyte compartment of the electrolytic oxidation cell. When the total chromium concentration of the anolyte solution approaches zero (on the order of 1 to 25 ppm), the solution may be directed out of the loop of the process of the present invention for disposal or further treatment.

EXAMPLE 1

A sample of sludge containing 27 wt% dry solids from a chromium plating facility was dissolved by placing chunks of the material in 2 L of sulfuric acid solution maintained at a pH of 1.0 to 1.5 and stirring until a chromium(III) concentration of about 35 g/L was reached. In addition to chromium, the dissolved sludge contained about 20 g/L copper(II), 40 g/L nickel(II), 6 g/L iron(III) and 3 g/L zinc(II). Copper(II) was first removed to a concentration of less than 400 ppm by coupled transport in substantially the same manner as set forth in the report by Baker, et al., 2 *J. Memb. Sci.* 213 (1977).

Figure 2:
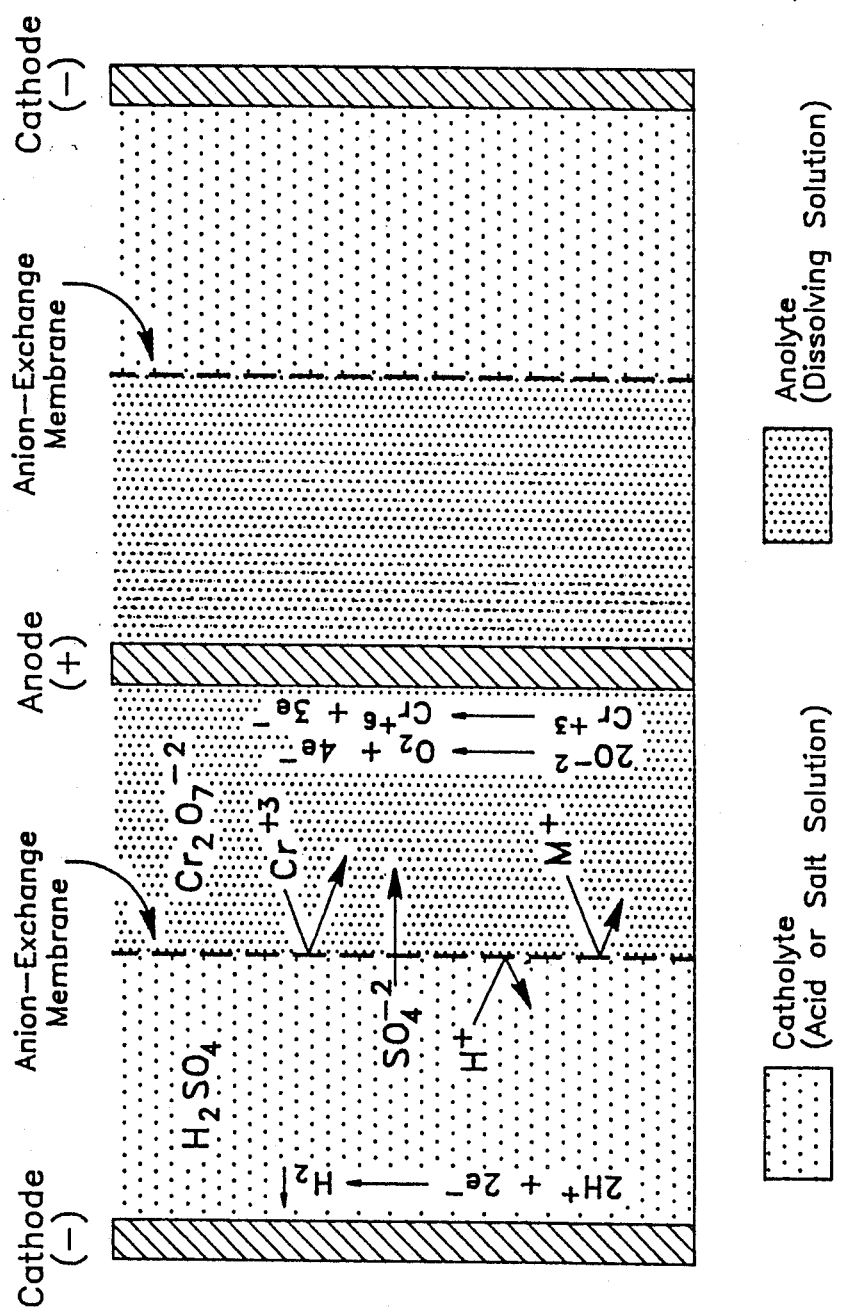
FIG. 2 is a schematic depiction of an exemplary electrolytic oxidation cell of the present invention, divided by two anion exchange membranes.
Figure 3:
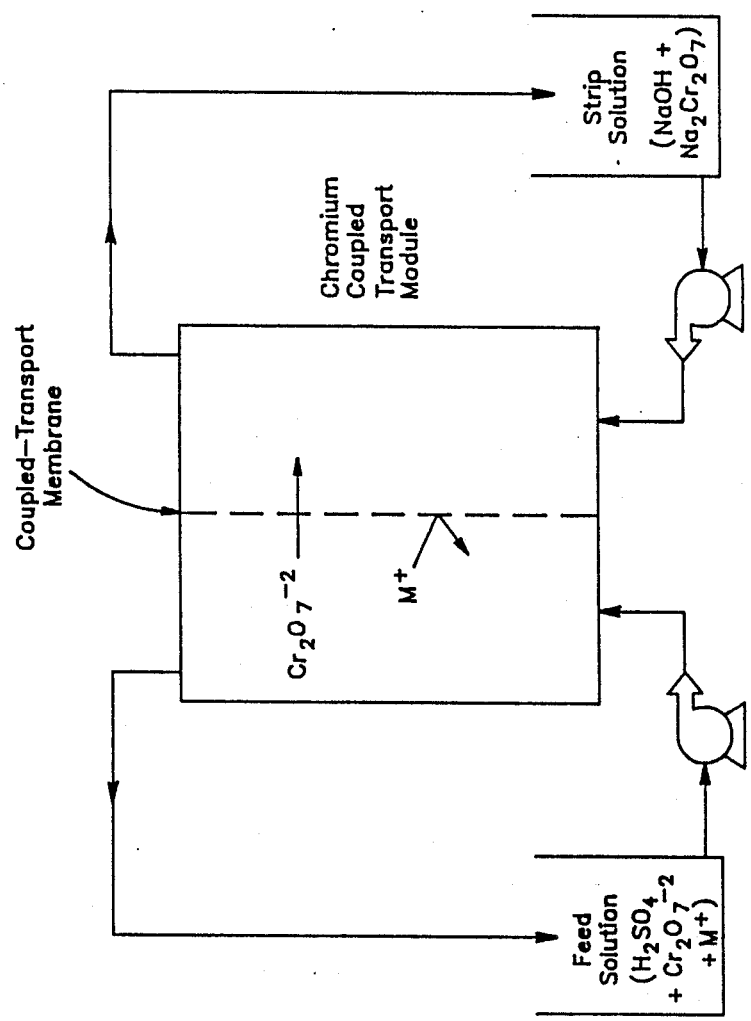
FIG. 3 is a schematic depiction of the coupled transport aspect of the present invention.

The process of the present invention was conducted in a batch mode as follows. The anolyte compartments of an electrolytic oxidation cell of the design shown in FIG. 2 were each filled with 1 liter of the dissolved sludge. The catholyte compartments were each filled with 1 liter of 1.0 M sulfuric acid. The anode was a 1/16-inch-thick lead sheet with an active surface area of 0.84 ft². The cathodes were 0.025-inch-thick stainless steel sheets, each with an active surface area of 0.84 ft². The anion exchange membranes, each positioned equidistant between the anode and cathodes, comprised the previously-mentioned RAIPORE 4035 membranes, each with an active surface area of 1 ft². The anode and cathodes were connected to a DC rectifier and the solutions were electrolyzed for 17.3 hours at an average current of about 1.30 amps, causing an increase in Cr(VI) concentration in the chromate form in the anolyte compartment from 0 to 3.47 g/L, indicating that 6.94 g of Cr(III) were oxidized. This amounted to an average current efficiency of 47.7% and a conversion of Cr(III) to Cr(VI) of about 20%.

This same Cr(VI)-containing anolyte solution was used as the feed solution for a lumen-side feed CT module comprising a potted bundle of 33 hollow fine anisotropic polysulfone fibers having 5-mil-thick walls, 70–85% porosity, pores about 0.10 to 2.0 microns in diameter, the pores being substantially filled with 30 vol% tri-(iso-tridecyl)amine in dodecane. The strip solution initially comprised a 1.0 M solution of NaOH. The feed and strip solutions were circulated for 45.6 hours. Initial flux through the membrane was 29.7 $\mu g/cm^2/min$, while the ending flux dropped to 18.2, for an average flux of 23.9. Cr(VI) in the strip solution increased from 0 to 7.26 g/L, thus representing an average gain in Cr(VI) concentration in the CT strip solution of about 0.32 g/hr.

EXAMPLE 2

A solution of dissolved sludge was prepared and had copper(II) removed in substantially the same manner as in Example 1. Two liters of the same were subjected to the process of the present invention in a continuous mode with the same parameters and under the same conditions as in Example 1 by simultaneously operating both the oxidation cell and the coupled transport module while cycling the anolyte solution sequentially through the oxidation cell and to the coupled transport unit as the feed solution and back for 26 hours. Within 18 hours the concentration of Cr(VI) in the anolyte/feed solution increased to about 6 g/L, at which it was maintained for the remainder of the 26-hour run. The concentration of Cr(VI) in the strip solution increased from 0 to 8.74 g/L during the 26-hour run. Compared to the batch mode Example 1 averages of 47.7% current efficiency and flux of 23.0 $\mu g/cm^2/min$, the same averages for the continuous mode run of this example were 100% and 54.9, respectively. The gain in Cr(VI) concentration in the CT strip solution was 1.59 g/hr, representing a five-fold increase over that of Example 1.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of recovering chromium values from chromium-containing waste comprising:
   (a) providing an electrolytic oxidation cell having at least one anode and at least one cathode and divided into at least one anode side and at least one cathode side by at least one anion exchange membrane, said cathode side having an electrically conductive solution and said anode and cathode being connected to a DC power source;
(b) providing a coupled transport module with a polymeric membrane containing a chromium(VI) liquid complexing agent and having a feed side and a strip side;
(c) contacting said chromium-containing waste with a dissolving acid to form an acidic chromium(III)-containing anolyte solution;
(d) directing said acidic chromium(III)-containing anolyte solution to each anode side of said electrolytic oxidation cell;
(e) providing sufficient potential from said DC power source to at least partially oxidize chromium(III) in said acidic chromium(III)-containing anolyte solution to chromium(VI) to form a coupled transport feed solution;
(f) transferring said coupled transport feed solution to the feed side of said membrane of said coupled transport module; and
(g) directing a strong base strip solution to the strip side of said membrane of said coupled transport module, thereby extracting chromium(VI) in a strip solution from said chromium-containing waste.

2. The method of claim 1 wherein said chromium-containing waste comprises an industrial waste sludge.

3. The method of claim 1 wherein said anion exchange member of said electrolytic oxidation cell of step (a) is a hydrophilic polymer containing amine groups that is permeable to anions and relatively impermeable to cations.

4. The method of claim 3 wherein the ratio of anion to cation permeability of said anion exchange member is 24 10.

5. The method of claim 3 wherein said anion exchange membrane is selected from the group consisting of poly(p-trimethyl-aminomethyl)styrene, poly(p-dimethylamino-methyl)styrene, and ration-grafted (tetramethyl-ammonium) polyethylene.

6. The method of claim 1 wherein said electrically conductive solution of step (a) is selected from the group consisting of an aqueous acid solution and an aqueous salt solution.

7. The method of claim 6 wherein said electrically conductive solution has a conductivity of $\geq 0.1$ $(ohm/cm)^{-1}$.

8. The method of claim 6 wherein said aqueous acid solution is a strong acid solution with a pKa of $\geq 4.0$.

9. The method of claim 8 wherein said strong acid solution is selected from the group consisting of sulfuric acid, hydrochloric acid, hydroiodic acid, hydrofluoric acid, phosphoric acid, and boric acid.

10. The method of claim 1 wherein said coupled transport module of step (b) is selected from the group consisting of a hollow fiber membrane module, a flat sheet membrane plate and frame module, and a flat sheet membrane spiral-wound module.

11. The method of claim 10 wherein the membrane of said coupled transport module contains a chromium(VI)-complexing agent comprising a primary, secondary, tertiary or quaternary amine with 20 to 65 carbon atoms that is substantially soluble in hydrocarbon solvents and substantially water-immiscible of the formula

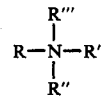

where R, R', R'' and R''' are selected from the group consisting of alkyl of 1 to 30 carbon atoms, and aryl of 6 to 30 carbon atoms.

12. The method of claim 11 wherein said chromium(VI)-complexing agent is selected from the group consisting of tri-(iso-tridecyl)amine, octadecyldimethylamine, tri-N-octylamine, dodecyldimethylamine, tri-N-dodecylamine, tetradecyldimethylamine, hexadecyldimethylamine, and dimethylhydrogenated tallow amine.

13. The method of claim 11 or 12 wherein said chromium(VI)-complexing agent is present in a hydrocarbon solvent in a concentration of $\geq 1$ wt%.

14. The method of claim 13 wherein the concentration of said chromium(VI)-complexing agent is approximately 30 wt%.

15. The method of claim 1 wherein said dissolving acid of step (c) is an aqueous acid solution of a strong acid with a pKa of $\geq 4$.

16. The method of claim 15 wherein said strong acid is present in a concentration of $\geq 0.1$ M and is selected from the group consisting of sulfuric acid, hydrochloric acid, hydroiodic acid, hydrofluoric acid, phosphoric acid, and boric acid.

17. The method of claim 1 wherein said strong base strip solution of step (g) has a pH of $\geq 9.0$ and is selected from the group consisting of alkaline metal- and alkaline earth metal hydroxides.

18. The method of claim 1 wherein the form of chromium(VI) of step (g) is dichromate.

19. The method of claim 1 wherein said chromium-containing waste includes metal ions selected from the group consisting of copper(II), silver(I), cadmium(II), cobalt(III), gold(I), lead(II), nickel(II), tin(IV) and zinc (II).

20. The method of claim 19 wherein copper(II) and silver(I) are first removed to concentrations of $<1000$ ppm and $<500$ ppm, respectively.

21. The method of claim 20 wherein the method of removal of copper(II) and silver(I) is selected from the group consisting of liquid extraction, coupled transport and by membrane contactors.

22. The method of claim 1 wherein the current density of said DC power source of step (e) is from 1 to 10 amp/ft$^2$.

23. The method of claim 1 wherein the rate of transfer of chromium(VI) across said membrane of steps (f) and (g) is $\geq 1$ μg/cm$^2$/min.

24. The method of claim 1 wherein said coupled transport feed solution is recycled to each anode side of said electrolytic oxidation cell.

25. The method of claim 1 wherein said strip solution is continuously recycled to the strip side of the membrane of said coupled transport module.

26. Apparatus for recovering chromium values from chromium-containing waste comprising:
(a) dissolving tank means for at least partially containing and for contacting said chromium-containing waste with a dissolving acid;
(b) a DC power source;

(c) an electrolytic oxidation cell having at least one anode and at least one cathode and divided into at least one anode side and at least one cathode side by at least one anion exchange membrane, said cathode side having an electrically conductive solution and said anode and cathode being connected to said DC power source;

(d) a coupled transport module with a membrane containing a chromium(VI) liquid complexing agent and having a feed side and a strip side;

(e) a strip solution reservoir for at least partially containing a strip solution;

(f) transfer means for transferring the contents of said dissolving tank means to the anode side of said electrolytic oxidation cell;

(g) transfer means for transferring the contents of said anode side of said electrolytic oxidation cell first to the feed side of said coupled transport module and then back to the anode side of said electrolytic oxidation cell; and (h) transfer means for transferring the contents of said strip solution reservoir to said strip side of said coupled transport module and back to said strip solution reservoir.

27. Apparatus of claim 26 wherein said transfer means of (f), (g) and (h) are pumps.

28. Apparatus of claim 26 including holding tank means for at least partially containing the contents of the anode side of said electrolytic oxidation cell during its transfer to the feed side of said coupled transport module.

* * * * *

UNITED STATES PATENT AND TRADEMARK OFFICE
CERTIFICATE OF CORRECTION

PATENT NO. : 4,948,476

DATED : August 14, 1990

INVENTOR(S) : David R. Kamperman, et al.

It is certified that error appears in the above-identified patent and that said Letters Patent is hereby corrected as shown below:

Col. 2, line 22: Insert a hyphen after "(III)"

Col. 2, line 38: Insert a hyphen after "(VI)"

Col. 2, line 46: Insert a hyphen after "(III)"

Col. 6, line 10: Change "cahtodes" to --cathodes--

Col. 7, line 37: Change "24" to --$\geq$--

Col. 7, line 42: Change "ration" to --radiation--

Col. 8, line 27: Change "0.1" to --0.01--

Signed and Sealed this

Twenty-first Day of January, 1992

Attest:

HARRY F. MANBECK, JR.

*Attesting Officer*     *Commissioner of Patents and Trademarks*